United States Patent
Downs et al.

(10) Patent No.: US 12,281,896 B2
(45) Date of Patent: Apr. 22, 2025

(54) STABILIZED EVAPORABLE GETTER FOR INCREASED HANDLEABILITY

(71) Applicant: Honeywell International Inc., Charlotte, NC (US)

(72) Inventors: John Downs, Morristown, NJ (US); Mahdi Mohajeri, Morristown, NJ (US); Dean Eivind Johnson, Orono, MN (US)

(73) Assignee: Honeywell International Inc., Charlotte, NC (US)

( * ) Notice: Subject to any disclaimer, the term of this patent is extended or adjusted under 35 U.S.C. 154(b) by 399 days.

(21) Appl. No.: 17/932,612

(22) Filed: Sep. 15, 2022

(65) Prior Publication Data

US 2024/0093998 A1   Mar. 21, 2024

(51) Int. Cl.
*G01C 19/66* (2006.01)
*H01J 7/18* (2006.01)
*H01J 29/94* (2006.01)

(52) U.S. Cl.
CPC .......... *G01C 19/661* (2013.01); *H01J 7/183* (2013.01); *H01J 29/94* (2013.01)

(58) Field of Classification Search
CPC .......... G01C 19/661; H01J 7/183; H01J 29/94
See application file for complete search history.

(56) References Cited

U.S. PATENT DOCUMENTS

| | | | |
|---|---|---|---|
| 4,077,899 A | 3/1978 | van Gils | |
| 4,406,972 A * | 9/1983 | Fransen | H01J 29/94 313/481 |
| 6,139,768 A * | 10/2000 | Urso | H01J 7/183 252/181.7 |
| 6,306,314 B1 * | 10/2001 | Martelli | H01J 7/183 252/181.7 |
| 6,853,135 B1 | 2/2005 | Fritz et al. | |
| 2005/0089627 A1 | 4/2005 | Chuntonov | |
| 2010/0275727 A1 | 11/2010 | Horie et al. | |
| 2019/0168496 A1 | 6/2019 | Hogan et al. | |

FOREIGN PATENT DOCUMENTS

| | | |
|---|---|---|
| EP | 0514348 B1 | 7/1995 |
| EP | 0509971 B1 | 9/1995 |
| EP | 0858093 A1 | 8/1998 |
| JP | 2008084987 A | 4/2008 |
| WO | 0200959 A1 | 1/2002 |
| WO | 2005124812 A1 | 12/2005 |

OTHER PUBLICATIONS

European Patent Office, "Extended European Search Report", dated Feb. 9, 2024, from EP Application No. 23194786.2, from Foreign Counterpart to U.S. Appl. No. 17/932,612, pp. 1 through 8, Published: EP.

* cited by examiner

*Primary Examiner* — Anne M Hines
(74) *Attorney, Agent, or Firm* — Fogg & Powers LLC (57) ABSTRACT

Systems and methods for a stabilized evaporable getter for increased handleability is provided. In certain embodiments, a method includes preparing a first getter material, a second getter material, and a metal material. Additionally, the method includes mixing the first getter material, the second getter material, and the metal material into a mixed getter material. Further, the method includes placing the mixed getter material into a getter holder. Also, the heat-treating the getter holder at a temperature below an activation temperature for an exothermic reaction of the mixed getter material but above a melting temperature of the metal material.

20 Claims, 4 Drawing Sheets

STABILIZED EVAPORABLE GETTER FOR INCREASED HANDLEABILITY

BACKGROUND

Ring laser gyroscopes (RLGs) provide rotation measurement information by measuring propagation length differences between two counter-propagating lasers within a ring-shaped cavity. During RLG operation, a maintained atmosphere within the ring-shaped cavity facilitates laser generation and laser operation. However, over the lifetime of RLGs, high-voltage electronics that drive laser generation within the cavity also cause the generation of contaminating gases like oxygen and nitrogen. Frequently, RLGs use passive systems to remove the contaminating gases to maintain the desired operating atmosphere within the cavity. Examples of passive systems include evaporable getters, thin reactive metal films that absorb the contaminant gases in the atmosphere using processes like oxidation or nitridation.

SUMMARY

Systems and methods for a stabilized evaporable getter for increased handleability is provided. In certain embodiments, a method includes preparing a first getter material, a second getter material, and a metal material. Additionally, the method includes mixing the first getter material, the second getter material, and the metal material into a mixed getter material. Further, the method includes placing the mixed getter material into a getter holder. Also, the heat-treating the getter holder at a temperature below an activation temperature for an exothermic reaction of the mixed getter material but above a melting temperature of the metal material.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

Per common practice, the drawings do not show the various described features according to scale, but the drawings show the features to emphasize the relevance of the features to the example embodiments.

DETAILED DESCRIPTION

The following detailed description refers to the accompanying drawings that form a part of the present specification. The drawings, through illustration, show specific illustrative embodiments. However, it is to be understood that other embodiments may be used and that logical, mechanical, and electrical changes may be made.

Systems and methods described herein are drawn to a stabilized getter having increased handleability. A typical getter mixture includes a first getter material (i.e., nickel) and a second getter material (i.e., barium aluminide). The present disclosure describes the addition of metal to the typical getter mixture to create a mixed getter material having increased handleability. When the additional metal has been added to the getter mixture, the mixed getter material can be pressed into a getter holder. After the mixed getter material is placed in the getter holder, the mixed getter material is heated within an inert environment to a sufficient temperature that causes the added metal to melt, yet the temperature is below a temperature that initiates exothermic reactions that cause the getter material to vaporize.

In typical embodiments of ring laser gyroscopes (RLGs), evaporable getters are used to deposit a metallic film that pumps contaminant gasses like oxygen and nitrogen from optical cavities within the RLGs throughout the operating life of the RLGs. However, the amount of deposited metallic film, if too much or too little, can negatively affect the operation of the RLG. For example, too much deposited metallic film can cause excessive oxidation of the laser excitation electrodes causing the electrodes to fail earlier than the desired operational life of the RLG. Further, if too little deposited metallic film is deposited within the RLG, the deposited metallic film may be unable to efficiently pump the contaminant gases out of the optical cavities within the RLG. Additionally, too much or too little metallic film deposited on the internal cavity can negatively affect the signal used by the RLG to sense rotation.

Typically, the pre-flashed getter material is a powder packed into a getter pan. When the getter pan with the getter material is installed within the optical cavity, some of the powder can be knocked out of the getter pan during the installation or flashing. When the powder gets knocked out of the getter pan within the optical cavity during installation, the powder can get on the mirrors and other components within the optical cavity. Powder on components like the gyro mirrors may cause the laser to scatter instead of cleanly reflecting the laser. The scattering may cause false or weak signals within the gyroscope.

Accordingly, if the getter material originally placed in the getter pan is knocked out during installation, either before installation in the optical cavity, during installation within the optical cavity, or during flashing of the getter material, there may be insufficient getter material to produce a getter film that sufficiently pumps contaminant gases out of the optical cavity. Further, when the getter material gets knocked out within the optical cavity, the loose getter material may settle on components within the optical cavity and negatively affect the operation of the RLG.

In embodiments described herein, adding metal to the getter material helps ensure that the desired amount of getter material is flashed into the getter film to prevent premature gyroscope failure from electrode oxidation. Also, adding metal can help reduce the amount of loose getter material that can negatively affect the operation of components within an optical cavity.

Figure 1:
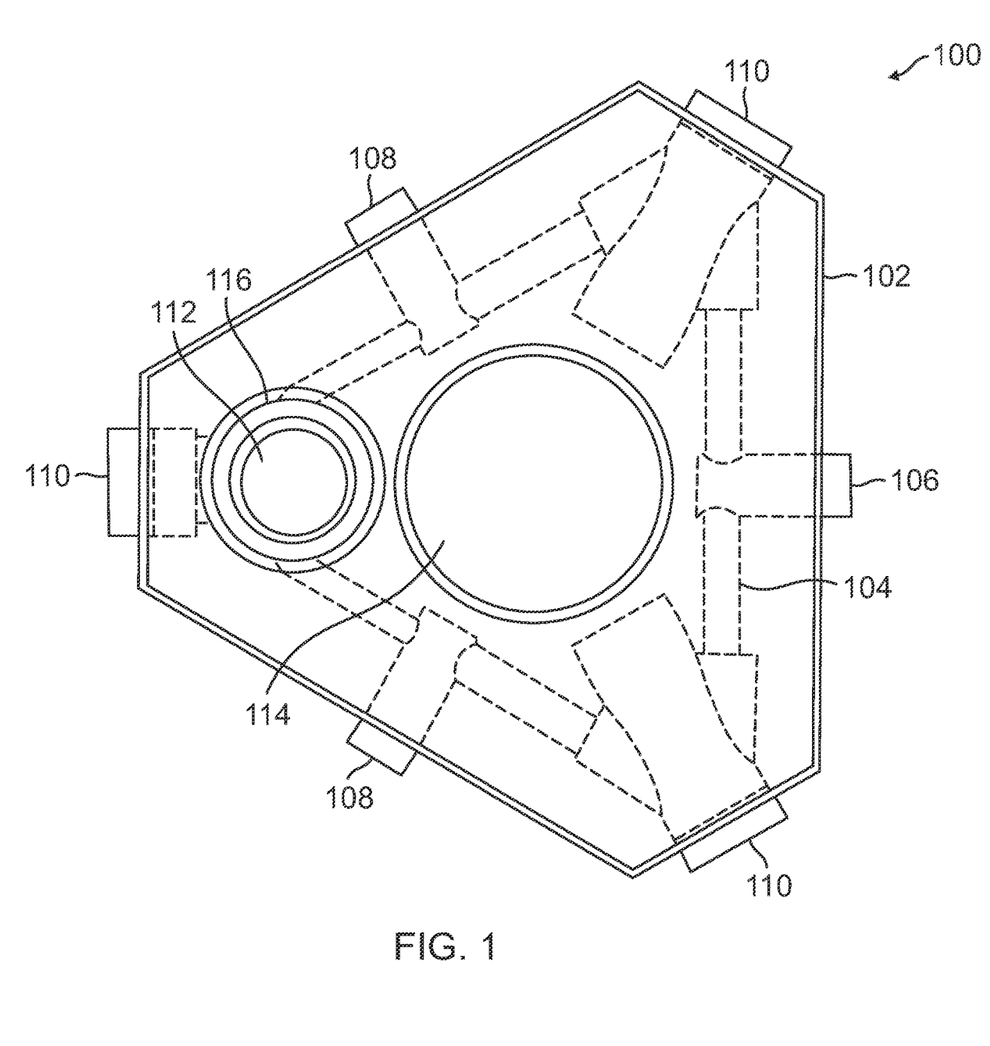
FIG. 1 is a diagram of an RLG having a getter according to an aspect of the present disclosure.

FIG. 1 shows a top view of an exemplary embodiment of an exemplary device that may use a getter to absorb contaminating gases. For example, the device may be a ring laser gyroscope (RLG) system 100. While the device is shown as an RLG, the getter, as described herein, may be used in devices other than RLGs, such as atomic clocks, electron microscopes, e-beam lithography devices, vacuum tubes, metal vapor lamps, and the like. The RLG system 100 may include a housing 102, a cavity 104, one or more cathodes 106, one or more anodes 108, one or more mirrors 110, a getter cavity 112, and a mounting structure 114.

The getter cavity 112 may be located within the housing 102, adjacent to the cavity 104. The getter cavity 112 may be any enclosure in which a getter material may be placed prior to activating the getter. After activation, the gas within the cavity 104 contacts the deposited getter film, where the deposited getter film may absorb contaminants from the gas within the cavity 104. The getter cavity 112 may be located at any location on the housing 102 that allows air to pass between the cavity 104 and an interior volume of the getter cavity 112. For example, the getter cavity 112 may be drilled through the top of a housing 102. Alternatively, the getter cavity 112 may be located in a gas discharge device mounted to a surface of the housing.

The RLG system 100 may produce rotation measurements by using counter-propagating laser beams directed to travel in a closed path (that is, a ring) to detect rotation about the axis of the path around which a laser beam is directed. The one or more mirrors 110 direct the laser beams about the closed path. For example, the one or more mirrors 110 may include three mirrors that direct the laser beam along a closed, triangular path, where each mirror is located at a corner of the triangular path.

To generate the laser beam, the one or more cathodes 106 and the one or more anodes 108 are electrodes that use electric fields to excite a gas mixture within the cavity 104 to generate light for forming a polarized laser beam. For example, the gas mixture within the cavity 104 may be a combination of helium and neon. To fill the cavity 104 with the desired gases, the cavity 104 may be sealed within a vacuum to evacuate potential contaminating gases from within the cavity 104. After being sealed, the cavity 104 is backfilled with the desired gases. However, after backfilling with the desired gases, the components of the RLG system 100 exposed to the cavity 104 may outgas, or air from the environment outside the RLG system 100 may contaminate the gases within the cavity 104 by permeation.

In certain embodiments, a getter holder 116 may be mounted within the getter cavity 112. The getter holder 116 may hold a getter material that can be activated for the deposition of a getter film, where the gas within the cavity 104 passes over the getter film. As the gas within the cavity 104 passes over the deposition getter film, the getter film absorbs the contaminating gases. For example, the getter film may absorb oxygen and nitrogen gases within the cavity 104. In some embodiments, the getter holder 116 may be a stainless-steel channel ring or getter pan that can be mounted within the getter cavity 112 using a snap ring, a spring, or other method for securing the getter holder 116 within the getter cavity 112.

In some embodiments, the getter material may be a mixture of a first getter material and a second getter material. The first getter material may be a first metal reactant, and the second getter material may be a compound having at least two parts. When sufficient heat is applied to the mixed getter material in a vacuum or sufficiently reduced pressure, a first part of the second getter material reacts with the first getter material in an exothermic reaction that causes the second part of the second getter material to turn into a vapor. For example, the first getter material may be nickel, the second getter material may be barium aluminide, and the first and second getter materials may be mixed at a 1:1 ratio, or the getter materials can be mixed at other possible ratios. However, the getter material may be a combination of other materials, such as titanium, zirconium, or other potential materials that have the same characteristics described above.

In certain embodiments, when activating the getter material, a heater may be applied to an external surface of the RLG system 100. For example, the heater may be an RF induction heater that heats the getter material to sufficiently high temperatures within a sufficiently low pressure to activate a chemical reaction between the different components of the getter material. When the getter material is nickel and barium aluminide, the aluminide reacts with the nickel through an aluminothermic reaction that causes the barium to vaporize. After activation, the barium vapor condenses as a barium film on surfaces of the cavity 104, where the barium film can absorb contaminating gases within the cavity 104.

However, if the reaction of the getter material progresses too rapidly, the reaction may cause the rapid development of vapor, causing getter material to sputter within the cavity 104, potentially damaging components within the RLG system 100 such as the one or more anodes 108 and the one or more cathodes 106. Conversely, if the reaction of the getter material progresses too slowly, components of the RLG system 100 may break down. Thus, if the reaction goes too fast or too slow, the reaction of the getter material negatively affects the ability of the RLG system 100 to excite a laser within the cavity 104.

As stated above, if some of the getter material falls out of the getter holder 116 during preparation for installation, installation, or flashing, the reaction may not proceed as quickly as desired or too quickly, leading to the components of the RLG system 100 oxidizing too quickly, or the deposited getter film being unable to absorb the contaminating gases within the cavity 104. Also, getter material can fall out within the cavity 104 and settle on components, like the one or more mirrors 110, within the cavity 104, where the settled getter material can interfere with the operation of the components.

In certain embodiments, to prevent the getter material from falling out of the getter holder 116, a metal material may be mixed with the getter material, and the mixed getter material can be heat-treated before installation. During the heat-treatment, the metal material may melt and solidify to form an agglomeration within the mixed getter material. The solid agglomeration of bonded metal material anchors the mixed getter material within the getter holder 116 and reduces the likelihood of the mixed getter material falling out of the getter holder 116 during cleaning, movement, installation, or flashing. Thus, the additional metal material makes the getter holder 116 more handleable and increases the likelihood of the resultant getter film and RLG system 100 operating as designed.

In some embodiments, the metal material may be a metal powder that is a reactant in the flashing reaction such that the metal material is consumed during activation of the getter. For example, when the first getter material is nickel and the second getter material is barium aluminide, the metal material may be aluminum. During activation of the getter, the nickel may react with the aluminum in both the barium aluminide and the metal powder in an aluminothermic reaction. The aluminothermic reaction heats the barium to a sufficient temperature that causes the barium to vaporize; the barium then condenses on surfaces within the cavity 104. In some implementations, where the reaction consumes the metal material, the metal material, first getter material, and second getter materials may be mixed at ratios where the reactants are substantially consumed. For example, when the first getter material is nickel (Ni), the second getter material is Barium Aluminide (BaAl₄), and the metal material is (Al), the exothermic reaction may proceed according to the following equation:

$$BaAl_4 + 5Ni + Al \rightarrow 5NiAl + Ba.$$

Accordingly, the amount of getter materials may be mixed such that the substantially all of the Ba is released as a vapor for deposition on an internal surface of the cavity while limiting the amount of NiAl left in the getter holder after the reaction. Thus, in some embodiments, with the added aluminum, more Ni may be added to accommodate the additional aluminum in the mixed getter material. For example, when the aluminum is added at about 4.7% of the weight of the mixed getter material, the barium aluminide can be mixed at 43.4% of the weight of the mixed getter material, and the nickel can be mixed at 51.2% of the weight of the mixed getter material.

In an alternative embodiment, the metal material may not be consumed as a reactant in the flashing reaction. Such a metal material may be a metal that has a melting temperature lower than the temperature needed to activate the getter. In such an embodiment, the first and second getter materials may be added at ratios that lead the first and second getter materials to be consumed, but the mixed getter material may have sufficient metal material such that the agglomerated metal powder can stabilize the mixed getter material within the getter holder 116. For example, when the first getter material is nickel (Ni), the second getter material is Barium Aluminide (BaAl₄), and the metal material is a different metal that does not participate in the exothermic reaction, the equation for the reaction may be the following equation:

$$BaAl_4 + 4Ni \rightarrow 4NiAl + Ba.$$

Accordingly, the amount of getter materials may be mixed such that the substantially all of the Ba is released as a vapor for deposition on an internal surface of the cavity while limiting the amount of NiAl left in the getter holder after the reaction. Thus, as 4Ni and BaAl₄ have similar weights, the BaAl₄ and 4Ni may be mixed close to a 1:1 ratio and the metal powder can be added as a percentage of the total weight, such as 1-5%.

Figure 2:
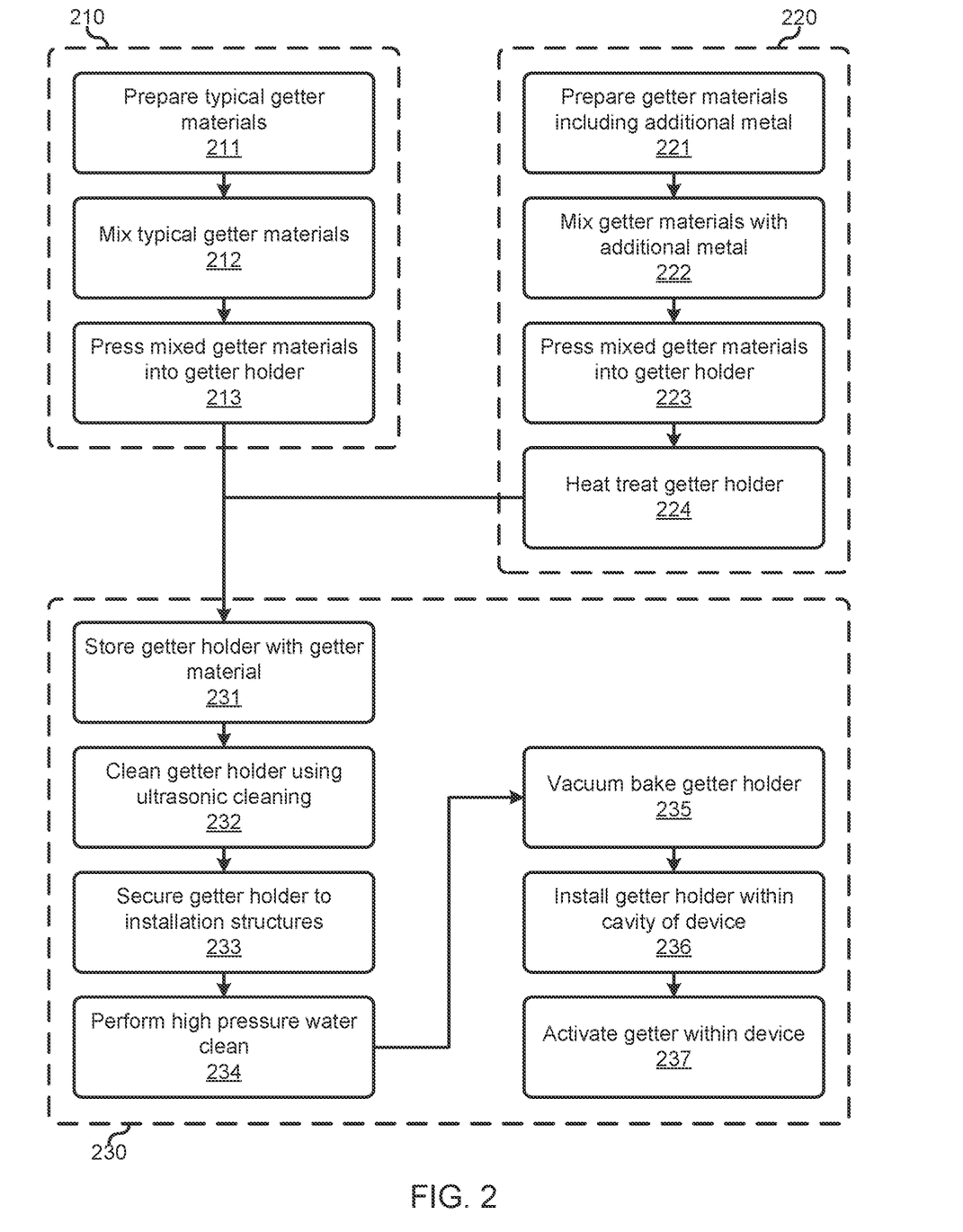
FIG. 2 is a flow chart diagram contrasting methods for preparing and installing getter material according to an aspect of the present disclosure.

FIG. 2 is a flow chart diagram illustrating a method 200 that portrays alternative sub-methods for preparing and installing a getter within a device. In particular, the method 200 includes alternative sub-methods 210 and 220. The sub-method 210 is a typical method for preparing the getter materials. The sub-method 220 is a method according to embodiments and systems described herein for preparing getter materials. After preparing the getter materials according to either of sub-methods 210 and 220, the method 200 proceeds at sub-method 230 for storing, cleaning, and installing the getter holder having getter material within a device.

In typical embodiments, the sub-method 210 proceeds at 211, where typical materials are prepared. For example, getter materials may be acquired and crushed. In embodiments where the getter materials are a combination of nickel or barium aluminide, the nickel and barium aluminide may be crushed to desired sizes. The size of the material determines the surface area of the particles of the getter materials. When flashing the material, the smaller the particles, the larger the surface area of the particles of the getter materials and the larger the reactive surface area of the particles of the getter material, where the reactive surface area is the area where different getter materials are in contact with each other. As the reactive surface area of the getter material increases, the speed of the reaction of the getter material also increases. If the speed is too fast, the reaction can cause some of the getter material to be expelled from a getter holder, and the getter material can be knocked out of the getter holder. But conversely, the larger the reactive material, the more likely the getter materials are not fully consumed during a subsequent activation reaction. Thus, the getter materials may be crushed to a particular size to facilitate the desired reaction speed.

Additionally, after the preparation of the getter materials, the sub-method 210 may proceed at 212, where typical getter materials can be mixed. For example, when a first getter material is nickel and a second getter material is barium aluminide, the prepared nickel and barium aluminide may be mixed. When the getter material is mixed, the method 210 proceeds at 213, where the mixed getter materials are pressed into a getter holder. For example, the mixed getter material may be pressed into a getter pan or channel ring. When the getter material is pressed into a getter holder, the getter holder can then be prepared for and installed within a device.

As stated above, the method 200 may include the sub-method 230 for cleaning, preparing, flashing, and installing the getter-holder within a cavity. For example, the method 230 receives the mixed getter material within a getter holder containing the typical getter material prepared using the sub-method 210. The sub-method 230 may proceed at 231, where the getter holder with the getter material is stored. For example, the getter holder with the getter material may be moved to a storage location for use at a later time. However, some of the pressed getter material may fall out of the getter holder when the getter holder is moved in response to potential shocks and bumps.

Further, the method 230 may proceed at 232, where the getter holder is cleaned using ultrasonic cleaning. For example, the getter material may have dust, loose getter material, and other contaminants on the getter holder that can interfere with the operation of devices that will eventually contain the installed getter holder. Thus, the getter holder may be cleaned using an ultrasonic cleaning process or other cleaning process to remove dust, loose getter material, and other contaminants from the getter holder. However, some of the getter material within the getter holder may be knocked out during the ultrasonic cleaning process. After the getter holder has been cleaned, the sub-method 230 proceeds at 233, where the getter holder is secured to an installation structure. For example, the getter holder may be welded to a snap ring or other installation structure, where the installation structure provides a physical interface for securing the getter holder at a designed position within a cavity in a device. Like previous steps, some of the getter material may be knocked out of the getter holder when the getter holder is secured to the installation structure.

Moreover, after securing the getter holder to the installation structure, the sub-method 230 proceeds at 234, where a high-pressure water clean is performed. For example, as described above, welding may be used to secure the getter holder to the installation structure. The securing process may leave some non-desired material on the getter holder. With welding, some welding splatter may be left on the getter holder, which may interfere with the activation of the getter. To remove the non-desired material from the conjoined getter holder and installation structure, the getter holder may be cleaned using a high-pressure water stream. The high-pressure water stream may also cause some of the getter material to be inadvertently knocked out of the getter holder.

After the getter holder has been cleaned with the water cleaning, the sub-method 230 proceeds at 235, where the getter holder is baked within a vacuum. For example, as the getter holder has been cleaned using water or other solvents, the getter material may have water and other residual liquids, like grease and other materials, that can evaporate out of or off of the getter material through a baking process. As some liquids boil when baked in a vacuum, the getter material may be expelled from the getter holder. Further, the getter material may be baked within a vacuum to prevent the getter material from reacting with molecules in the gas.

After baking the getter holder, the sub-method 230 proceeds at 236, where the getter holder is installed within the cavity of the device. For example, a snap ring attached to the getter holder may be depressed and placed inside a cavity at a desired location, and then the snap ring can be released to secure the getter holder at the desired location. When the getter holder is secured within the cavity, the cavity may be sealed within a vacuum. In some implementations, the sealed cavity may be backfilled with a specific composition of inert gases. During the installation process, some of the getter material may fall out of the getter holder within the cavity.

After installation, the sub-method 230 proceeds at 237, where the getter is activated within the device. For example, an inductive heater may be placed near the getter holder to heat the getter holder to a temperature that initiates an exothermic reaction. The heat generated by the exothermic reaction causes a metal in the second getter material to vaporize, where the metal then condenses on an internal surface of the cavity. In some implementations, if the vaporization happens too quickly, the vaporization may expel some of the getter material from the getter holder.

As discussed above, when the getter material is prepared using the typical getter material preparation process described in sub-method 210, the getter material is susceptible to being knocked out of the getter holder at many of the storage, cleaning, preparation, and installation steps described in the sub-method 230. Accordingly, systems and methods described herein allow for the preparation of getter material that is less likely to fall out of the getter holder during the steps of the sub-method 230. In particular, the sub-method 220 provides for the preparation of getter material using an additional metal material that is more likely to remain in the getter holder during the storage, cleaning, preparation, and installation steps of the sub-method 230.

In certain embodiments, the sub-method 220 proceeds at 221, where the getter materials are prepared, where the getter material includes an additional metal material. For example, typical getter materials include a first getter material and a second getter material that react with each other in an exothermic reaction. Additionally, a metal material may be prepared along with the first and second getter materials. As described above, the metal material may be a particular metal that melts at a lower temperature than the activation temperature for the exothermic reaction. Further, the metal material may additionally be a metal that participates in the exothermic reaction. Further, the metal material may be prepared as a powder to be mixed with the first and second getter materials.

Additionally, after the preparation of the getter materials, the sub-method 220 may proceed at 222, where the getter materials and the metal material can be mixed together. For example, when a first getter material is nickel and a second getter material is barium aluminide, the prepared nickel and barium aluminide may be mixed with a metal material that is aluminum powder. When the getter material is mixed together, the method 220 proceeds at 223, where the mixed getter materials are pressed into a getter holder. For example, the mixed getter material may be pressed into a getter pan or channel ring.

In certain embodiments, when the mixed getter materials are pressed into the getter holder, the sub-method 220 may proceed at 224, where the getter holder is heat-treated. When the getter holder is heat-treated, the getter holder is heated to a temperature that causes the metal material to melt. For example, when the metal material is aluminum, the mixed getter material may be heated to a temperature between 660° C. and 700° C. At this temperature, the metal material will melt, but the getter material will not activate. Further, when the getter materials are heat-treated, the getter materials may be heat-treated within an inert environment to prevent the getter materials from reacting with airborne molecules. In some implementations, the higher the temperature, the more thoroughly the added metal material may melt and agglomerate. However, the higher the temperature, the more likely the getter materials may activate.

After heat-treating, the getter holder with the mixed getter material having the added metal material will cool, and the metal material will solidify, resulting in larger agglomerates. The agglomeration of the metal will cause the getter material to be more solid such that the mixed getter material is less likely to fall out of the getter holder during the steps of the sub-method 230 described above. Thus, after the preparation of the getter material with the additional metal material, the sub-method 230 is performed with the getter material prepared using the sub-method 220. The agglomerated metal in the getter material reduces the amount of getter material that falls out of the getter holder during the sub-method 230.

Figure 3:
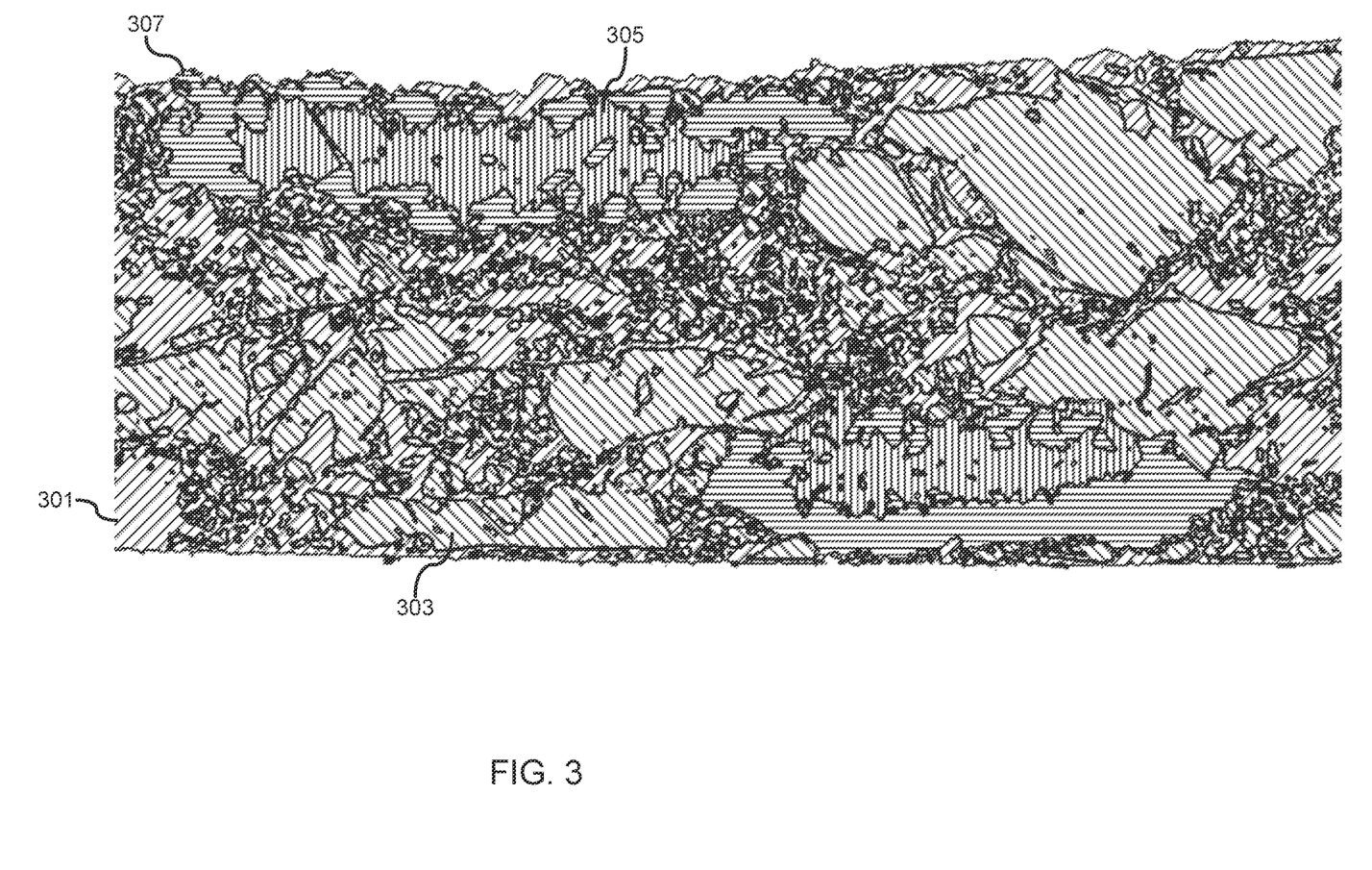
FIG. 3 is a cross-sectional diagram illustrating components of getter material according to an aspect of the present disclosure.

FIG. 3 is a cross-sectional diagram illustrating the different components of mixed getter material 300 having the added metal material after the performance of the heat-treatment described as part of step 224. Each of the different elements is represented by a different hatching pattern. After heat-treatment, the getter material 300 may include a first getter material 301, a second getter material 303, and a metal material 305. Additionally, the mixed getter material 300 may include an additional component that is a mixture 307 of the metal material 305 with portions of the first getter material 301 and the second getter material 303.

As illustrated, the different components of the mixed getter material 300 may be crushed to various sizes. For example, when preparing the different getter materials, the first getter material 301 and the second getter material 303 can be mixed at a 1:1 ratio. As described above in connection with step 211, the size ratio of the first getter material 301 to the second getter material 303 affects the speed of the reaction during activation. In particular, the speed of the reaction is directly proportional to the area of the surface of the second getter material 303 in contact with the surface of the first getter material 301. However, if the area of the surfaces of the first getter material 301 and the second getter material 303 in contact with each other is too high, then the activation reaction may be too violent and cause the mixed getter material to expel material from the getter holder. Conversely, if the area of the surfaces of the first getter material 301 and the second getter material 303 in contact with each other is too low, the activation reaction may be too slow or may not occur.

As described above, the added metal material 305, once agglomerated to form a solid mass within the mixed getter material, may secure the first getter material 301 and the second getter material 303 within a getter holder. For example, the metal material 305 may secure the getter material by acting as a weight within the mixed getter material. For example, the metal material 305 may be larger and heavier than the first getter material 301 and the second getter material 303. As such, it would take greater force to eject or knock out the metal material 305 from the getter holder than the first or second getter materials. Thus, the getter material is more secure within the getter holder during transportation and activation.

Additionally, the mixture 307 may include portions of the first getter material 301 and the second getter material 303 secured to a section of or encapsulated within the metal material 305. Thus, as the first getter material 301 and the second getter material 303 are secured to the metal material 305 within the mixture 307, the first getter material 301 and the second getter material 303 are secured within the getter holder with the larger metal material 305. However, the first getter material 301 and second getter material 303 within the mixture 307 are unable to react with each other unless the metal material 305 is also able to participate in the exothermic reaction. Thus, as the first getter material 301 and the second getter material 303 that are not part of the mixture 307 react with each other during the activation reaction, the metal material 305 may participate in the reaction, which can then free up the first getter material 301 and the second getter material 303 within the mixture 307 for participating in the activation reaction.

In exemplary embodiments, the metal material 305 may be initially added to the mixed getter material as a metal powder at an amount equal to 1-5% of the total weight of the mixed getter material 300. Less metal powder may be added, but having less metal material 305 within the mixed getter material 300 may limit the ability of the metal material 305 to keep the mixed getter material 300 within a getter holder. More metal powder may be added, but as the metal material 305 increases, the more of the first getter material 301 and the second getter material 303 become part of the mixture 307, which reduces the area of the surfaces of the first getter material 301 and the second getter material 303 in contact with each other. As described above, reducing the area of the surface of the reactants also reduces the speed of the reaction and may even prevent the reaction from happening.

In an exemplary application, the first getter material 301 is a nickel powder, and the second getter material 303 is barium aluminide. During activation, the nickel reacts with the aluminum in an aluminothermic reaction, which causes the barium to vaporize for deposition on a surface of an internal cavity. In some implementations, the added metal may be aluminum. As such, the metal may be consumed during the aluminothermic reaction. However, the metal material 305 may be a metal other than aluminum. If such a metal is used, the metal would have a melting point less than the activation temperature for the getter material.

Figure 4:
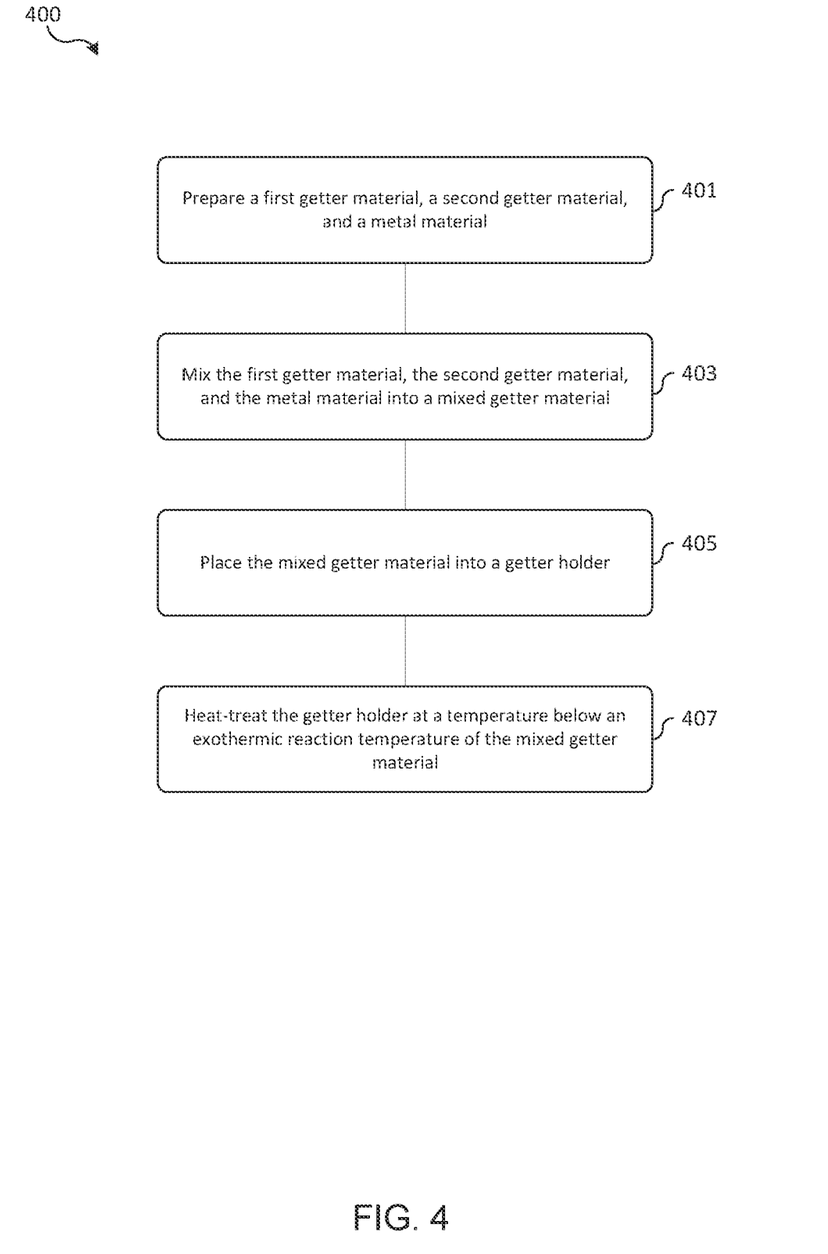
FIG. 4 is a flow chart diagram illustrating a method for preparing an evaporable getter according to an aspect of the present disclosure.

FIG. 4 depicts a flow diagram illustrating a method 400 for adding a metal material to getter material for use as an evaporable getter. The method 400 may be implemented via the techniques described in connection with FIGS. 1-3 but may be implemented using other techniques known to one having skill in the art. The blocks of the flow diagram have been arranged in a generally sequential manner to facilitate explanation. But, the arrangement of the blocks is merely exemplary, and the blocks can be arranged in any manner sufficient to provide the functionality described above with respect to FIGS. 1-3.

The method 400 proceeds at 401, where a first getter material, a second getter material, and a metal material are prepared. For example, the first getter material may be nickel, the second getter material may be barium aluminide, and the metal material is aluminum. The different materials may be crushed to desired sizes. Further, the method 400 proceeds at 403, where the first getter material, the second getter material, and the metal material are mixed into a mixed getter material. For example, the nickel, the barium aluminide, and the metal material may be mixed to form the mixed getter material.

When the getter material is mixed, the method 400 proceeds at 405, where the mixed getter material is placed within a getter holder. For example, the mixed getter material may be pressed into a getter pan or channel ring. Additionally, the method 400 proceeds at 407, where the getter holder is heat-treated at a temperature below an exothermic reaction temperature of the mixed getter material. For example, the getter holder may be heated to a temperature that causes the metal material to melt but not to a temperature that would activate the getter. After cooling down, the metal material agglomerates forming solid masses within the getter holder that allow the getter material to be more secure within the getter holder during preparation and installation within any devices.

Example Embodiments

Example 1 includes a method comprising: preparing a first getter material, a second getter material, and a metal material; mixing the first getter material, the second getter material, and the metal material into a mixed getter material; placing the mixed getter material into a getter holder; and heat-treating the getter holder at a temperature below an activation temperature for an exothermic reaction of the mixed getter material but above a melting temperature of the metal material.

Example 2 includes the method of Example 1, wherein preparing the metal material comprises preparing an aluminum powder.

Example 3 includes the method of any of Examples 1-2, wherein mixing the first getter material, the second getter material, and the metal material into a mixed getter material, comprises mixing the metal material at 1-5% of a total weight of the mixed getter material.

Example 4 includes the method of any of Examples 1-3, wherein preparing the first getter material comprises preparing nickel and preparing the second getter material comprises preparing barium aluminide.

Example 5 includes the method of any of Examples 1-4, wherein placing the mixed getter material into the getter holder comprises at least one of: placing the mixed getter material into a getter pan; and placing the mixed getter material into a channel ring.

Example 6 includes the method of any of Examples 1-5, further comprising at least one of: storing the getter holder having the heat-treated mixed getter material; cleaning the getter holder having the heat-treated mixed getter material; attaching the getter holder having the heat-treated mixed getter material to an installation structure; baking the getter holder having the heat-treated mixed getter material; installing the getter holder having the heat-treated mixed getter material within an internal cavity of a device; and applying heat to the getter holder installed within the device to activate the exothermic reaction of the mixed getter material.

Example 7 includes the method of Example 6, wherein applying heat to the getter holder installed within the device to activate the exothermic reaction consumes the metal material.

Example 8 includes the method of any of Examples 6-7, wherein installing the getter holder having the heat-treated mixed getter material within an internal cavity of the device comprises installing the getter holder having the heat-treated mixed getter material within an internal cavity of a ring laser gyroscope.

Example 9 includes the method of any of Examples 1-8, wherein heat-treating the mixed getter material comprises heating the mixed getter material between 660° C. and 700° C.

Example 10 includes an apparatus comprising: a getter holder; and mixed getter material within the getter holder, wherein the mixed getter material comprises: a first getter material; a second getter material; and a metal material; wherein the metal material is mixed with the first getter material and the second getter material, and the metal material has been heated to cause the metal material to melt and agglomerate together without activating the mixed getter material.

Example 11 includes the apparatus of Example 10, wherein the metal material is a metal that is consumed in an exothermic reaction that activates the mixed getter material.

Example 12 includes the apparatus of Example 11, wherein the metal material is aluminum.

Example 13 includes the apparatus of any of Examples 10-12, wherein a weight of the metal material is 1-5% of a total weight of the mixed getter material.

Example 14 includes the apparatus of any of Examples 10-13, wherein the first getter material is nickel and the second getter material is barium aluminide.

Example 15 includes the apparatus of any of Examples 10-14, wherein the getter holder is at least one of: a getter pan; and a channel ring.

Example 16 includes the apparatus of any of Examples 10-15, wherein the getter holder is installed within an internal cavity of a device.

Example 17 includes the apparatus of Example 16, wherein the device is a ring laser gyroscope.

Example 18 includes a method comprising: preparing a first getter material, a second getter material, and a metal material; mixing the first getter material, the second getter material, and the metal material into a mixed getter material; pressing the mixed getter material into a getter holder; heat-treating the getter holder at a temperature below an activation temperature for an exothermic reaction of the mixed getter material but above a melting temperature for the metal material; installing the getter holder within an internal cavity of a device; and applying heat to the getter holder installed within the device to activate the mixed getter material.

Example 19 includes the method of Example 18, wherein applying heat to the getter holder installed within the internal cavity of the device causes the exothermic reaction to consume the metal material.

Example 20 includes the method of Example 19, further comprising preparing the getter holder for installation, wherein preparing the getter holder for installation comprises: cleaning the getter holder having the heat-treated mixed getter material; attaching the getter holder having the heat-treated mixed getter material to an installation structure; and baking the getter holder having the heat-treated mixed getter material.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
   preparing a first getter material, a second getter material, and a metal material;
   mixing the first getter material, the second getter material, and the metal material into a mixed getter material;
   placing the mixed getter material into a getter holder; and
   heat-treating the getter holder at a temperature below an activation temperature for an exothermic reaction of the mixed getter material but above a melting temperature of the metal material.

2. The method of claim 1, wherein preparing the metal material comprises preparing an aluminum powder.

3. The method of claim 1, wherein mixing the first getter material, the second getter material, and the metal material into a mixed getter material, comprises mixing the metal material at 1-5% of a total weight of the mixed getter material.

4. The method of claim 1, wherein preparing the first getter material comprises preparing nickel and preparing the second getter material comprises preparing barium aluminide.

5. The method of claim 1, wherein placing the mixed getter material into the getter holder comprises at least one of:
   placing the mixed getter material into a getter pan; and
   placing the mixed getter material into a channel ring.

6. The method of claim 1, further comprising at least one of:
   storing the getter holder having the heat-treated mixed getter material;
   cleaning the getter holder having the heat-treated mixed getter material;
   attaching the getter holder having the heat-treated mixed getter material to an installation structure;
   baking the getter holder having the heat-treated mixed getter material;
   installing the getter holder having the heat-treated mixed getter material within an internal cavity of a device; and
   applying heat to the getter holder installed within the device to activate the exothermic reaction of the mixed getter material.

7. The method of claim 6, wherein applying heat to the getter holder installed within the device to activate the exothermic reaction consumes the metal material.

8. The method of claim 6, wherein installing the getter holder having the heat-treated mixed getter material within an internal cavity of the device comprises installing the getter holder having the heat-treated mixed getter material within an internal cavity of a ring laser gyroscope.

9. The method of claim 1, wherein heat-treating the mixed getter material comprises heating the mixed getter material between 660° C. and 700° C.

10. An apparatus comprising:
    a getter holder; and
    mixed getter material within the getter holder, wherein the mixed getter material comprises:
    a first getter material;
    a second getter material; and
    a metal material;
    wherein the metal material is mixed with the first getter material and the second getter material, and the metal material has been heated to cause the metal material to melt and agglomerate together without activating the mixed getter material.

11. The apparatus of claim 10, wherein the metal material is a metal that is consumed in an exothermic reaction that activates the mixed getter material.

12. The apparatus of claim 11, wherein the metal material is aluminum.

13. The apparatus of claim 10, wherein a weight of the metal material is 1-5% of a total weight of the mixed getter material.

14. The apparatus of claim 10, wherein the first getter material is nickel and the second getter material is barium aluminide.

15. The apparatus of claim 10, wherein the getter holder is at least one of:
   a getter pan; and
   a channel ring.

16. The apparatus of claim 10, wherein the getter holder is installed within an internal cavity of a device.

17. The apparatus of claim 16, wherein the device is a ring laser gyroscope.

18. A method comprising:
   preparing a first getter material, a second getter material, and a metal material;
   mixing the first getter material, the second getter material, and the metal material into a mixed getter material;
   pressing the mixed getter material into a getter holder;
   heat-treating the getter holder at a temperature below an activation temperature for an exothermic reaction of the mixed getter material but above a melting temperature for the metal material;
   installing the getter holder within an internal cavity of a device; and
   applying heat to the getter holder installed within the device to activate the mixed getter material.

19. The method of claim 18, wherein applying heat to the getter holder installed within the internal cavity of the device causes the exothermic reaction to consume the metal material.

20. The method of claim 19, further comprising preparing the getter holder for installation, wherein preparing the getter holder for installation comprises:
   cleaning the getter holder having the heat-treated mixed getter material;
   attaching the getter holder having the heat-treated mixed getter material to an installation structure; and
   baking the getter holder having the heat-treated mixed getter material.

* * * * *